(12) United States Patent  (10) Patent No.: US 7,504,028 B1
Gurfinkel  (45) Date of Patent: Mar. 17, 2009

(54) WATER-CONTAMINANT SEPARATION SYSTEM

(76) Inventor: Benjamin Gurfinkel, 3571 Syracuse Ave., San Diego, CA (US) 92122

( * ) Notice: Subject to any disclaimer, the term of this patent is extended or adjusted under 35 U.S.C. 154(b) by 0 days.

(21) Appl. No.: 12/035,605

(22) Filed: Feb. 22, 2008

(51) Int. Cl.
*E02B 15/04* (2006.01)

(52) U.S. Cl. .............................. 210/170.11; 210/242.3; 210/526; 210/923

(58) Field of Classification Search ................ 210/747, 210/776, 800, 804, 170.09, 170.11, 242.3, 210/257.1, 258, 259, 526, 923
See application file for complete search history.

(56) References Cited

U.S. PATENT DOCUMENTS

| | | | | |
|---|---|---|---|---|
| 2,891,672 A | * | 6/1959 | Veld et al. | 210/242.3 |
| 3,643,804 A | * | 2/1972 | Sharpton | 210/923 |
| 3,685,653 A | * | 8/1972 | Van Stavern et al. | 210/776 |
| 3,844,944 A | * | 10/1974 | Mercuri | 210/800 |
| 3,847,816 A | * | 11/1974 | DiPerna | 210/242.3 |
| 3,968,041 A | * | 7/1976 | De Voss | 210/242.3 |
| 4,178,247 A | * | 12/1979 | Janson | 210/242.3 |
| 4,876,011 A | * | 10/1989 | Betts et al. | 210/526 |
| 4,921,605 A | * | 5/1990 | Chastan-Bagnis et al. | 210/242.3 |
| 5,066,407 A | * | 11/1991 | Furlow | 210/776 |
| 5,743,694 A | * | 4/1998 | Hines | 210/923 |
| 5,902,664 A | | 5/1999 | Gurfinkel | |
| 5,968,354 A | * | 10/1999 | Brinkley | 210/923 |
| 7,311,818 B1 | | 12/2007 | Gurfinkel | |

\* cited by examiner

*Primary Examiner*—Christopher Upton
(74) *Attorney, Agent, or Firm*—Frank G. Morkunas

(57) ABSTRACT

A mobile water-contaminant separation system having a plurality of separate water separation units connected to one another, a conveyor component which captures contaminated water at a first end, conveys the contaminated water to a second end, and deposits the contaminated water in a first of the plurality of water separation units for processing. A pump between succeeding water separation units facilitates the transfer from a prior water separation unit to a succeeding water separation unit for further processing until the contaminated water is completely de-contaminated.

8 Claims, 5 Drawing Sheets

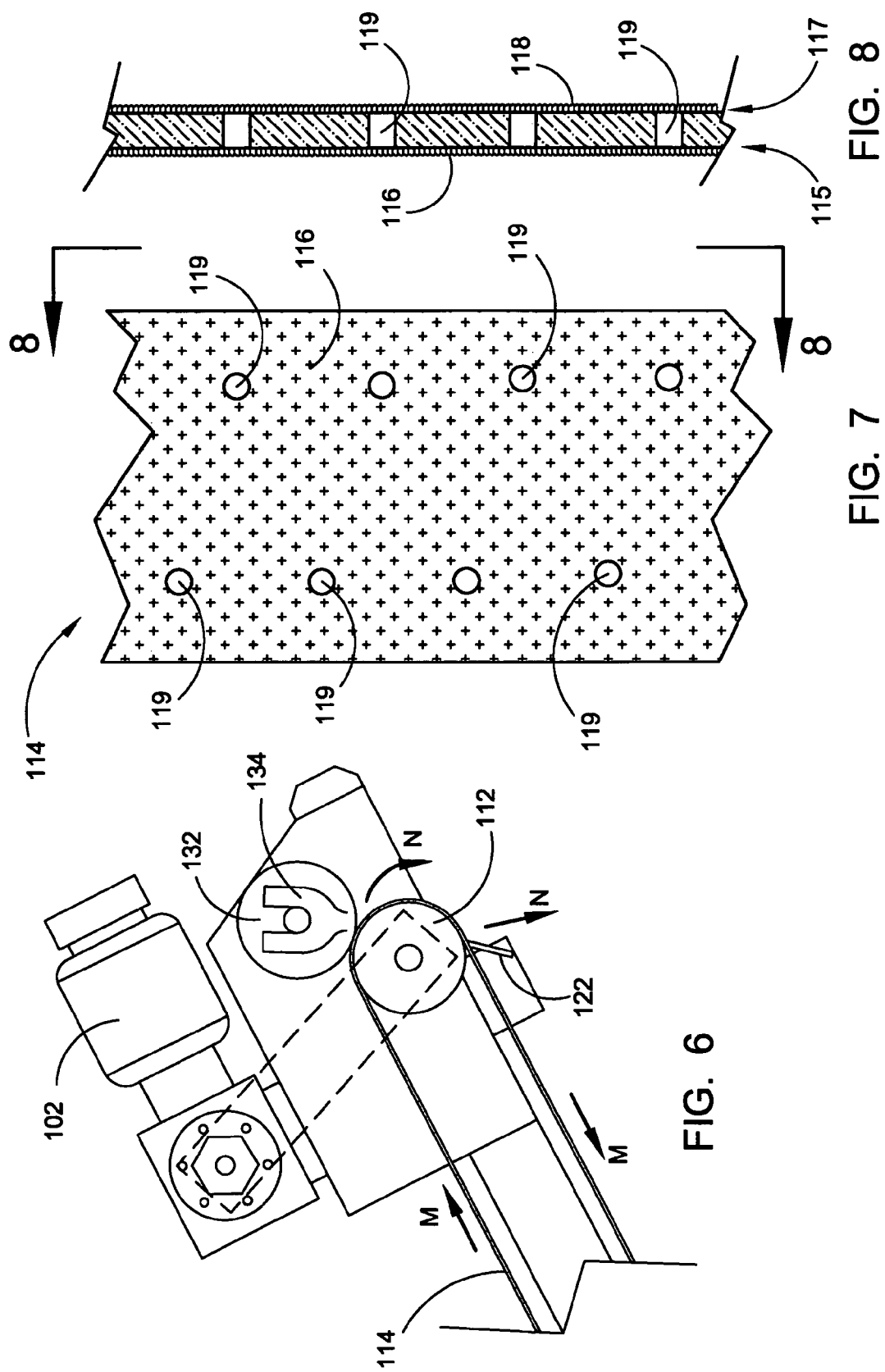

WATER-CONTAMINANT SEPARATION SYSTEM

CROSS REFERENCES TO RELATED APPLICATIONS

None.

STATEMENT REGARDING FEDERALLY-SPONSORED RESEARCH OR DEVELOPMENT

Not applicable.

BACKGROUND

This relates to an improvement in separators of particles from storm water or polluted bodies of water [rivers, lakes, harbors, oceans, and the like], and more particularly to oil, water, and debris separators from storm water and polluted bodies of water.

All municipalities have storm drains and sewer drains for movement of storm water and waste water for possible later processing and or disposal. All have an interest in containing and efficiently disposing of storm waters. Storm waters, and run-off water of the type associated with irrigation and hosing, typically will run down from various grades of slopes and into the streets ultimately into the storm drains.

For the purpose of this disclosure, and unless otherwise clear from the text, storm water in general refers to actual storm water and run-off water as described above. Polluted bodies of water refers to any pollutant contaminating that body of water such as, but not limited to, oil spills.

In the process of the movement and flow of storm water and run-off water, they will pick up minute particles of sand or stone, vegetation, silt, oils, and other debris. For the purpose of this disclosure, all oils will be referred to as oil and all other particles will be referred to as debris. Water coming from irrigation or from a homeowner's hose [while washing a vehicle, hosing down a sidewalk, and the like] is basically and relatively clean and usable water and, in many cases, even potable except for its collection of minute particles and oils as described above. Because of contaminants such as the oils and debris mixing into this 'clean' water as it courses to and through the storm drains it is clearly rendered unsuitable for any domestic use let alone drinking.

Strategies and treatment of run-off water had to evolve around the reality that run-off water maintained unacceptable traces of debris and oils and were not suitable for instant re-use. Because of the inability to treat run-off water, or the undesirability to treat run-off water due to costs, a great deal of this potentially re-usable storm water is discharged into oceans, lakes, rivers, and the like thereby wasting a valuable resource and avoidably polluting those bodies of water in the process.

These bodies of water have suffered their own share of contaminants, particularly from oil spills, large and small. Some well publicized, others not. In U.S. Pat. No. 7,311,818 issued to applicant on Dec. 25, 2007, applicant described and disclosed a novel water separation unit to meet the needs of de-contaminating and salvaging run-off storm water.

In further experimentation and combination of applicant's invention as described and disclosed in U.S. Pat. No. 5,902,664 issued on May 11, 1999, with applicant's invention of U.S. Pat. No. 7,311,818, each of which are hereby incorporated by reference, as further combined with additional components, applicant has devised a system and method of de-contaminating spills in bodies of water.

Accordingly, several objects and advantages of the water-contaminant separation system of this disclosure are that it is simple and relatively inexpensive to construct, simple to install, easy to use, mobile, and easier to maintain while separating debris from spills in bodies of water reclaiming potable water in the process.

The foregoing has outlined some of the more pertinent objects of the water-contaminant separation system of this disclosure. These objects should be construed to be merely illustrative of some of the more prominent features and applications of the water-contaminant separation system of this disclosure. Many other beneficial results can be attained by applying the disclosed water-contaminant separation system of this disclosure in a different manner or by modifying the water-contaminant separation system of this disclosure within the scope of the disclosure. Accordingly, other objects and a fuller understanding of the water-contaminant separation system of this disclosure may be had by referring to the summary of the water-contaminant separation system of this disclosure and the detailed description of the preferred embodiment in addition to the scope of the water-contaminant separation system of this disclosure defined by the claims taken in conjunction with the accompanying drawings.

SUMMARY

The above-noted problems, among others, are overcome by the water-contaminant separation system of this disclosure. Briefly stated, the water-contaminant separation system of this disclosure contemplates a mobile water-contaminant separation system having a plurality of separate water separation units connected to one another from discharge port of one to the inlet of another, a conveyor component to communicate with contaminated water in a body of water at its first end and to capture the contaminated water at the first end, conveys the contaminated water to a second end, and deposit the contaminated water in a first of the plurality of water separation units for processing.

A pump between succeeding water separation units facilitates and hastens the transfer of partially or completely de-contaminated water from a prior water separation unit to a succeeding water separation unit for further processing, as necessary, until all the contaminated water is completely de-contaminated. De-contaminated water is discharged from the last of the plurality of water separation units into a receptacle.

The foregoing has outlined the more pertinent and important features of the water-contaminant separation system of this disclosure in order that the detailed description that follows may be better understood so the present contributions to the art may be more fully appreciated. Additional features of the water-contaminant separation system of this disclosure will be described hereinafter which form the subject of the claims. It should be appreciated by those skilled in the art that the conception and the disclosed specific embodiment may be readily utilized as a basis for modifying or designing other structures and methods for carrying out the same purposes of the water-contaminant separation system of this disclosure. It also should be realized by those skilled in the art that such equivalent constructions and methods do not depart from the spirit and scope of the water-contaminant separation system of this disclosure as set forth in the appended claims.

BRIEF DESCRIPTION OF THE DRAWINGS

For a fuller understanding of the nature and objects of the water-contaminant separation system of this disclosure, reference should be had to the following detailed description taken in conjunction with the accompanying drawings in which:

FIG. 6 is a detailed view of the terminal end components of the conveyor component.

FIG. 7, as taken on line 7-7 of FIG. 5, is a detailed plan view of the conveyor belt.

FIG. 8, as taken on line 8-8 of FIG. 7, is a detailed side exploded view of the conveyor belt.

DETAILED DESCRIPTION

Figure 1:
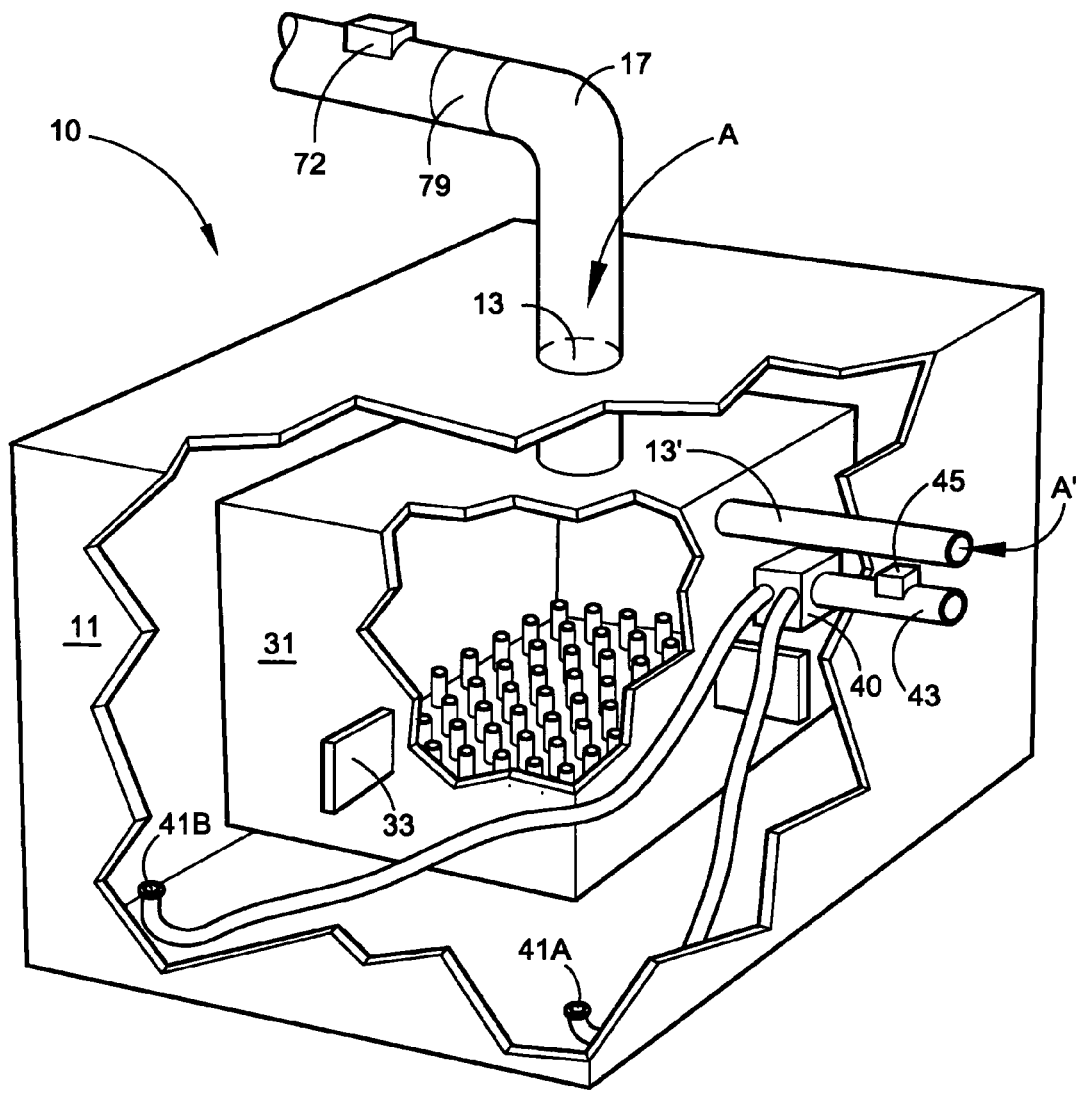
FIG. 1 is partially cut-away perspective view of a water separation unit, a primary component of this disclosure.

Referring now to the drawings in detail and in particular to FIG. 1, reference character 10 generally designates a water separation unit, a primary component of the water-contamination separation system constructed and used in accordance with a preferred embodiment thereof. A detailed description of this primary component, the water separation unit 10 is provided. It comprises an outer housing 11 and contained within the outer housing 11, and inner housing 31. The outer housing 11 has a bottom, a top, and side walls connected to each other and to the bottom and to the top thereby defining a container capable of holding fluids.

Figure 3:
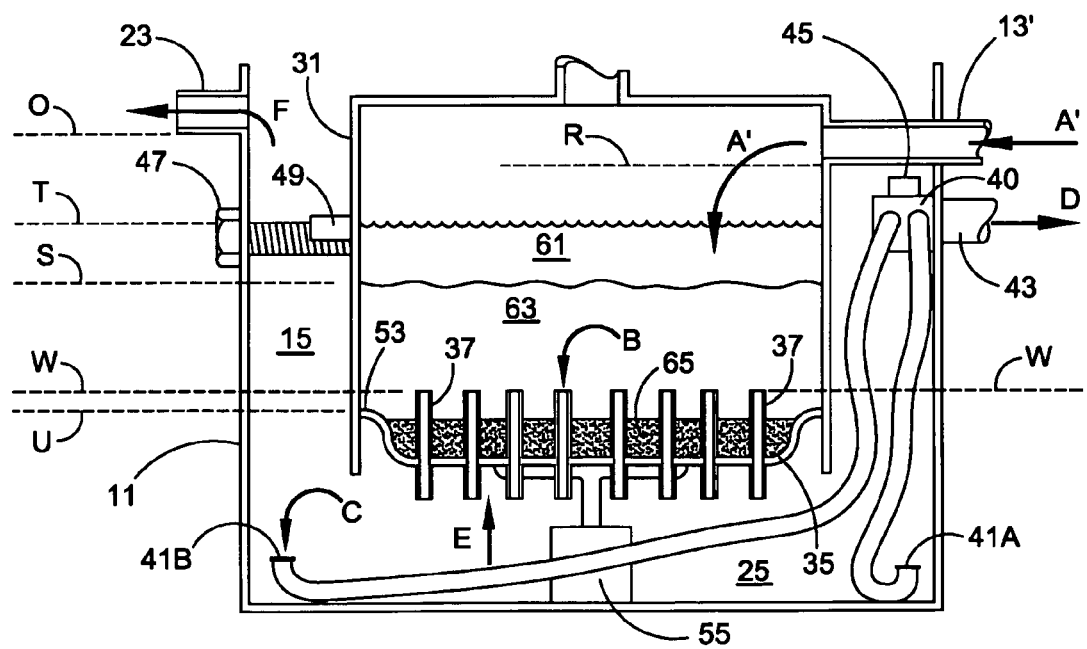
FIG. 3 is front elevation cut-away view, as taken on line 3-3 of FIG. 2, of the internal components of the water separation unit, a primary component of this disclosure.
Figure 4:
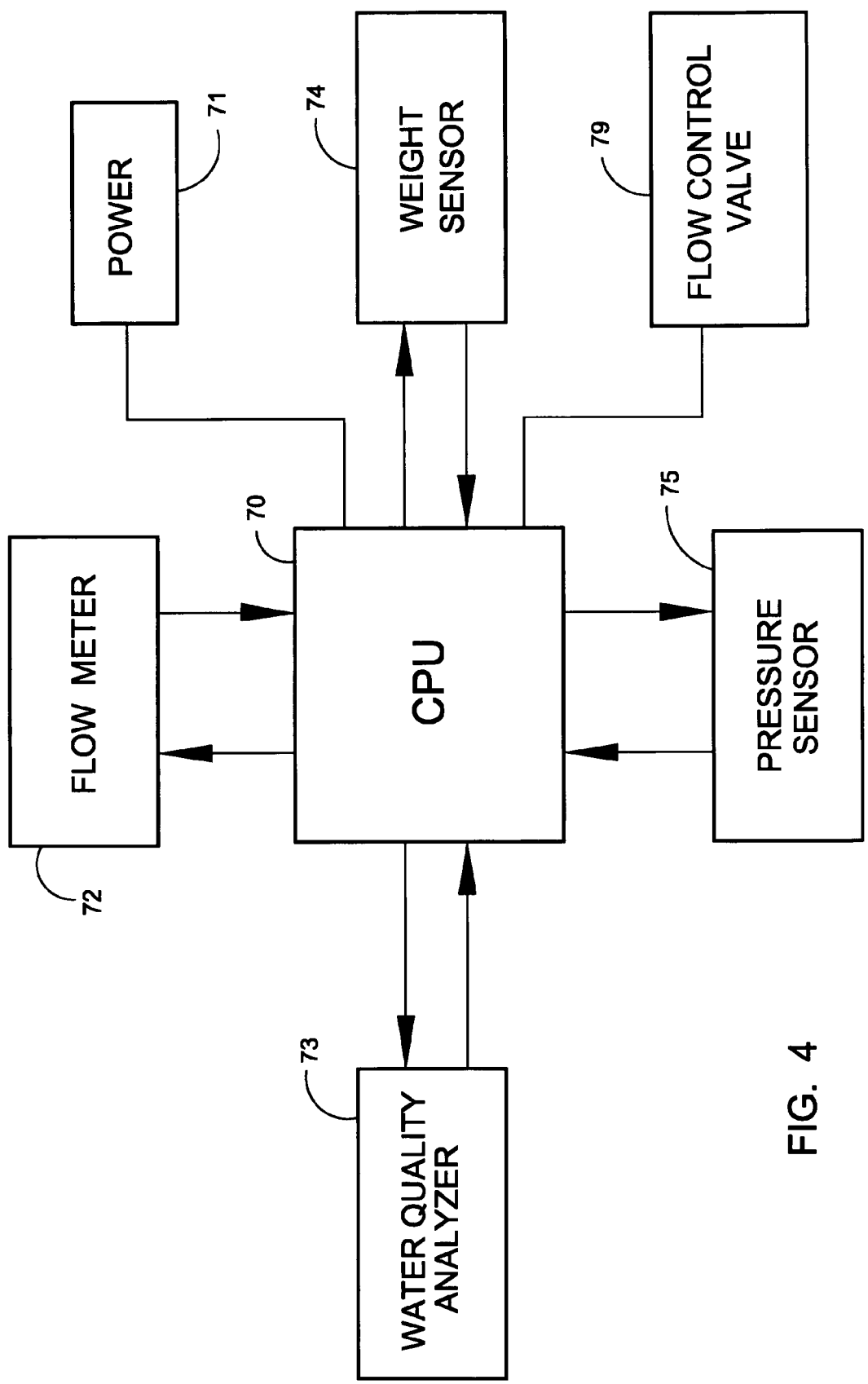
FIG. 4 is a flow chart depicting some operational components of the water separation unit, a primary component of this disclosure.

As illustrated in FIGS. 1 and 3, the inner housing 31 also is a container also capable of holding fluids except for the hollow tubes 37 in the floor 35 of the inner housing 31 [to be described later]. The inner housing 31 is suspended above the bottom of the outer housing and away from the side walls of the outer housing. The inner housing also is configured with a top and side walls connected to each other and to the top.

Support members 33 connected to the outer surface of the inner walls and to the inner surface of the outer walls support and suspend the inner housing 31 above the bottom of the outer housing 11 and away from the outer walls. A side space 15 is defined between the inner walls and the outer walls. A bottom space 25 is defined below the floor 35 of the inner housing 31 and the bottom of the outer housing 11.

The support members 33 may be permanently attached to the inner walls and the outer walls as illustrated in FIG. 1 or may be configured to be removable in order that the inner housing 31 may be removed from the outer housing 11 as necessary. FIG. 3 refers. Here a saddle or cradle 49 is on the outer surface of the inner wall. A bolt 47 is passed through an aperture [not shown] on the outer wall and into a threaded aperture [not shown] in the inner wall. The cradle 49 is above the inner wall aperture. The bolt 47 and cradle 49 combination supports the inner housing 31 in a suspended relation to the outer housing 11 and creates and maintains the side space 15 and bottom space 25 as described above. One or more such bolt 47 and cradle 49 combinations may be on all sides of the outer wall and the inner wall.

Figure 2:
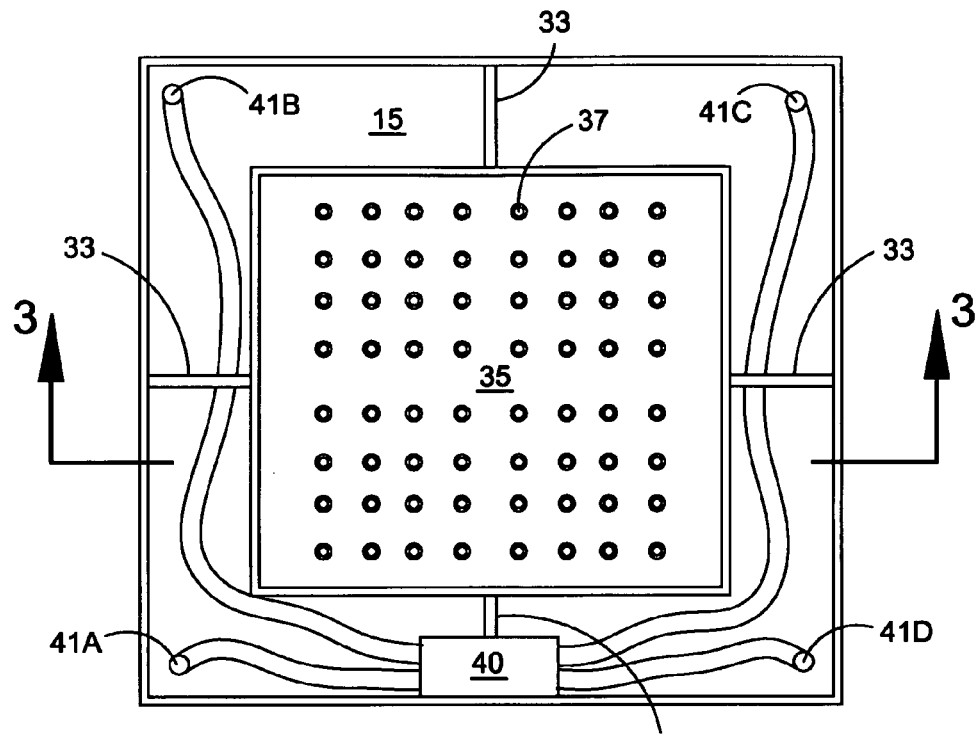
FIG. 2 is a top plan view, with top removed, of the water separation unit, a primary component of this disclosure.

Attention is now invited to FIGS. 1 through 3. A plurality of hollow tubes 37 extend above and below the floor 35 to provide a passageway for fluids from the chamber of the inner housing 31 down and into the bottom space 25 and side space 15. The tops of each tube 37 is on the same horizontal plane referred to herein as a tube plane and represented by reference character W. The tube plane W, therefore, generally is static.

A top inlet 13 or side inlet 13' provide a passageway for fluid [i.e., storm water or any contaminated water] to enter into the inner housing 31 from the outside. Whether a top location 13 or a side location 13' or both will be used will depend on where the water separation unit 10 will be placed for use when being used as a stand-alone unit and not as part of the complete water-contamination separation system as described herein.

The water separation unit 10 may be configured with only a top inlet 13 or only a side inlet 13' or both with a valve in each to be placed in an open mode or a closed mode. A horizontal inlet plane is establish by the side inlet 13' and is represented by reference character R. The inlet plane R generally is static.

Contaminated water enters either at the top inlet 13, direction of Arrow A, or the side inlet 13', direction of Arrow A', and into the chamber of the inner housing 31. For the complete water-contamination separation system as described herein entry from the top 13 into the first of one of these water separation units 10 is preferred.

The inner housing 31 is fully enclosed except for the inlets above and the plurality of tubes 37 as described above. Contaminated water will accumulate upward from the floor 35. The upper level of the contaminated water build up is referred to herein as the top plane and represented by reference character T. Because this level and plane can change, the top plane T is dynamic.

Debris 65 will be separated downward by gravity and will settle on the floor 35. Over time and operation, it will build up. The upper plane of the build up of debris 65 is referred to herein as the sediment plane and represented by reference character U. Because this level and plane can change over time and build or removal, sediment plane U is dynamic.

Also and almost immediately oil 61 will separate upward from the contaminated water settling as clean water 63 above the debris 65 and below the oil 61. The point of separation between the oil 61 and the clean water 63 is referred to as the separation plane and is represented by reference character S. Since this plane can change over time and flow, the separation plane S is dynamic.

As contaminated water and clean water accumulate and rise, gravity and atmospheric pressure will cause the clean water 63 to pass into and through the tubes 37, in the direction of Arrow B, into the bottom space 25. Clean water 63 will then pass, in the direction of Arrow C, into the exposed openings of several conduits 41A-D located in the bottom space 25 and up and gather and concentrate into a manifold 40.

From here, in a stand-alone setting [i.e., a single water separation unit 10] the clean water 63 will be discharged from the water separation unit 10 through the discharge tube 43, in the direction of Arrow D, which is connected to the manifold 40 and is in communication with the outside environment or suitable receptacle or distribution unit 63.

In a water-contamination separation system where more than one water separation unit 10 is used, each successive water separation unit 10 in connected to its preceding water separation unit 10 in series; i.e., discharge tube 43 of a prior water separation unit 10 discharges cleaner water into the inlet 13, 13' of the next succeeding water separation unit 10 and so on.

An air relief valve 45 on the manifold 40 permits and facilitates the free flow of clean water 63 from the water separation unit 10. Although four such conduits 41A-D are shown, more or less, depending on the desired overall size of the water separation unit 10 and its location and efficiency, may be used.

For the free flow of clean water 63 as described above, the top plane T must be at or above the discharge tube 43 and the inlet plane R should generally be above the discharge tube 43. In the event of an uncontrollable influx of contaminated water into the water separation unit 10 and commensurate excess amount of clean water 63 being discharged from the inner housing 31 and build up of clean water 63 in the side space 15, an overflow tube 23 accommodates passage of clean water 63 out of the water separation unit 10, in the direction of Arrow F, and into a suitable container or distribution unit for further use or processing or both. The overflow tube 23 is at what is referred to herein as the overflow plane and is represented by reference character O. Typically the overflow plane O is static and is at or above the inlet plane R.

The floor 35 of the inner housing 31 is configured to move up, in the direction of Arrow E, and down accordingly. A sealing member 53 around the perimeter of the floor 35 prevents fluids from passing into or out of the inner housing 31. The floor 35 rests on a push rod or piston 55. The piston 55 is in the bottom space 25. The piston may be hydraulic, mechanical, or electrical.

The purpose of the piston 55 is to engage the piston 55 to move the floor 35 up to the top of the inner housing 31 when debris 65 has accumulated or built up to unacceptable levels or weights. When such occurs, the operation of the water separation unit 10 is shut down, the piston 55 engaged, the top of the inner housing 31 removed to expose the uplifted floor 35 so that the accumulated debris 63 may be removed or in the alternative, the floor 35 removed and replaced with a debris-free floor 35. Any conventional piston 55 suited for the intended purpose will suffice.

The bottom of the piston 55 is on the bottom of the outer housing 11 and the top of the piston 55 is on the outside surface floor 35 of the inner housing. The entire water separation unit 10 may be manually controlled or, preferably, controlled automatically with a conventional control unit or computer system 70 programmed to react to various predetermined situations and to control all operations for incoming contaminated water and discharge of clean water as described herebelow.

Any conventional power supply 71 will control the operation of the control unit 70. A flow meter 72 in the inlet pipe 17, in communication with the inlet 13, 13' for example, detects when contaminated water begins flowing into the water separation unit 10 and may be programmed to regulate and restrict its flow or to shut off the flow. Conventional valves 79, associated with the respective inlets 13, 13', and in communication with the control unit 70, provide this feature.

A water quality analyzer 73 in communication with the discharge tube 43 or the manifold 40 or both, is programmed to analyze the quality of the clean water 63 being discharged from the water separation unit 10. The water quality analyzer 73 may also be in communication with the overflow tube 23.

Conventional commercially available valves in the discharge tube 43 and the overflow tube 23 [not shown] are in communication with the water quality analyzer 73 and the control unit 70 to cause the flow of water to be ceased when predetermined unacceptable quality levels are reached. This could happen when, for example, the sediment plane U, through accumulation of debris 65, rises above the tube plane W and debris 65 begins flowing through the tubes 37, the conduits 41A-D, and out the discharge tube 43; or with excessive and rapid influx of contaminated water into the inner housing 31 such that turbulence results preventing separation of oil 61 from contaminated water and preventing settlement of debris 65 from contaminated water.

In such case, some oils 61 or some debris 65 or both may exit the inner housing 31 through the tubes 37, through the conduits 41A-D and out the discharge tube 43. The water quality analyzer 73 will detect such and cause the shut-off component 79 to shut down the system and close all valves until the situation normalizes.

A pressure sensor 75 in communication with the control unit 70 and the piston 55 detects that the piston is properly pressurized and ready for engagement.

A weight sensor 74 in communication with the floor 35 and the control unit 70 is programmed to detect when certain pre-determined weight levels of debris 65 have accumulated. When a pre-determined weight has been detected, the inlet valves and discharge valves will be shut to a closed mode, the piston 55 will be engaged, and the floor 35 raised, so that the debris 65 may be removed and the operation of the water separation unit 10 resumed.

The water separation unit 10 may be constructed of any suitable materials such as, but not limited to, concrete, plastics, and metals [preferably metals relatively impervious to oxidation or treated to be relatively impervious to oxidation]. The water separation unit 10 may be placed in any suitable locations associated with flowing contaminated water or collection points for contaminated bodies of water or both.

One or more water separation units 10 may be connected to other water separation units 10, in series, to increase the capacity of water separation as necessary. In this regard, the discharge tube 43 of one water separation unit 10 may be connected to the inlet 13, 13' of a second water separation unit 10; the discharge tube 43 of the second water separation unit 10 may be connected to the inlet 13, 13' of a third water separation unit 10; the discharge tube 43 of third water separation unit 10 may be connected to the inlet 13, 13' of a fourth water separation unit 10; and so on.

Studies have also shown that an oil barrier, such as essentially created inside the inner housing 31 at the separation plane S and above, acts to almost immediately bacteria in the clean water 63 below. Consequently, and depending on the contamination level of the polluted, potable water is capable of being discharged from the water separation unit 10 of the first such unit. In cases of greater contamination, potable is capable of being discharged from the water separation unit 10 of any succeeding unit.

Figure 5:
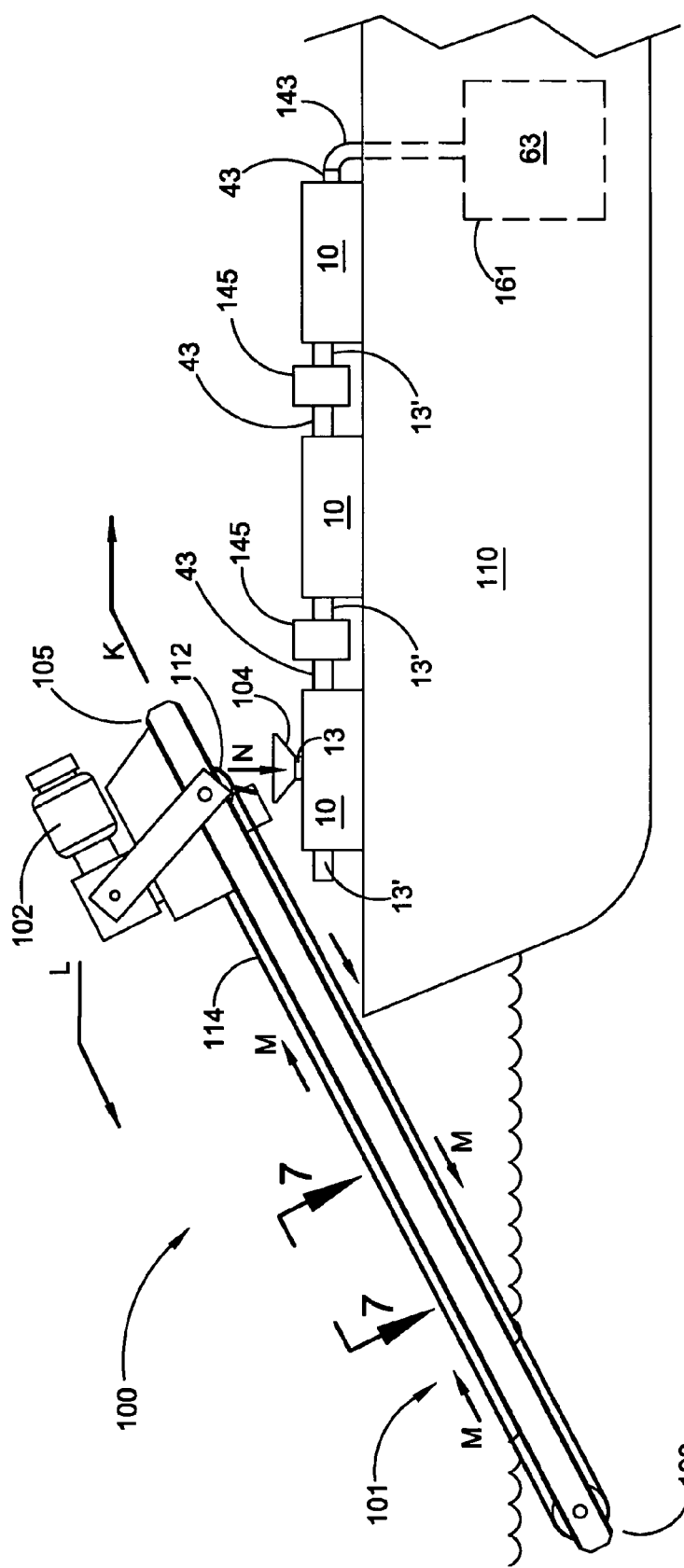
FIG. 5 is a schematic view of the complete system in operational mode.

FIG. 5 is illustrative of the water-contaminant separation system 100 deployed on a sea-going mobile platform 110. It must be understood that the mobile platform may a land-roving mobile platform such as on a truck or truck bed or similar wheeled conveyance.

For the entire system 100, one or more water separation units 10 are connected to one another [referred to as series connection as previously described]. Though three are shown, this is for illustration purposes only and not by means of limitation. The discharge tube 43 of one water separation unit 10 is connected to the inlet 13' of an adjacent water separation unit 10 with a conventional commercially available pump 145 in between to facilitate and hasten the removal water from the first water separation unit 10 and into the next adjacent water separation unit 10.

Contaminated water may be de-contaminated after cycling through the first water separation unit 10 in which case, the clean water 63 will be discharged through a final discharge tube 143 and into a suitable receptacle 161. That outcome will depend on the degree of contamination at a particular site.

Other key features to the water-contaminant separation system 100 are its mobility and the conveyor component 101 as illustrated in general in FIG. 5 and in greater detail in FIGS. 6 through 8.

The conveyor component 101 comprises a conveyor belt 114 with drive pulley 112 attached to a conventional drive motor 102 to drive the conveyor belt 114, a weight pulley 132 seated in a weight pulley cradle 134 and directly above and resting on the drive pulley 112, a scraper 122 adjacent to and below the drive pulley 112, and receiving hopper 104. The weight pulley cradle 134 has an open upper end to permit the weight pulley 132 to rise in its seat should large debris be passing through yet also cause the weight of the weight pulley 132 to be continually exerted against the drive pulley 112 with the conveyor belt 114 in between thereby squeezing out contaminated water from the conveyor belt 114 and into the receiving hopper 104 for processing.

The conveyor belt 114 is of a non-absorbent material comprising one or more layers 115, 117. Each layer 115, 117 has loop-type features 116, 118. It has been found that a Velcro®-type loop fastener component is best suited as the non-absorbent material for this conveyor belt 114 and not unlike that which is disclosed in U.S. Pat. No. 5,902,664.

A plurality of apertures 119 are on the conveyor belt 114 for reasons and functionality as set forth in U.S. Pat. No. 5,902,664. The conveyor belt 114 may be comprised of a single first layer 115 with loops 116 and apertures 119 or of a first and second layer 115, 117, connected together with loop-side 116, 118 each facing outward.

The conveyor component 101, along with the one or more water separation units 10, are housed on the mobile platform 110. When the water-contaminant separation system 100 is needed, the mobile platform 110 is brought to the contaminated area. The front end 103 of conveyor component 101 is moved forward and down in the direction of Arrow L to thereby be dipped into the contaminated water. The back end 105 of the conveyor component 101 is placed adjacent to and above the hopper 104. The motor 102 is started causing the conveyor belt 114 to move in the direction of Arrow M and capture contaminated water.

Contaminated water is caught in the loop-like fibers 116, 118 of the conveyor belt 114 and conveyed up and to the back of the conveyor component 101. The weight pulley 132 and the scraper 122 are above the hopper 104. As conveyor belt 114 with contaminated water thereon passes under the weight pulley 132, the force and pressure of the weight pulley 132 squeezes out the contaminated water from the conveyor belt 114 causing the contaminated water to fall into the hopper 104 in the direction of Arrow N.

The scraper 122 is tightly pressed against the conveyor belt 114 such that as the conveyor belt 114 passes over the scraper 122, the scraper 122 scrapes off any remaining contaminated water residing on the conveyor belt 114 causing that now removed contaminated water to drop into the hopper 104 in the direction of Arrow N. The contaminated water is now cycled and processed through the first water separation unit 10, and others as necessary to fully de-contaminate the water and deposit clean water 63 into a suitable receptacle 161 on, in, or near the mobile platform 110.

The process continues with the conveyor belt 114 capturing contaminated water and delivering the contaminated water to the first water separation unit 10 until all the contaminated water is removed from the body of water to which the water-contaminant separation system 100 was brought.

It should be understood that though the water separation unit 10 described herein is preferred for the water-contaminant separation system 100, any similar unit capable of separating contaminants from polluted water may be used and need not include the various sensing components described herein. It should also be understood that the front water separation unit 10 in FIG. 5 is the water separation unit 10 into which contaminated water is being placed into the system. The order can be reversed wherein the rear most water separation unit 10 is the initial receiving unit and the contaminated water is being process from the rear most water separation unit 10 through each succeeding water separation units 10 up to the front water separation unit 10.

The present disclosure includes that contained in the present claims as well as that of the foregoing description. Although this water-contaminant separation system of this disclosure has been described in its preferred forms with a certain degree of particularity, it is understood that the present disclosure of the preferred forms has been made only by way of example and numerous changes in the details of construction and combination and arrangement of parts and method steps may be resorted to without departing from the spirit and scope of the water-contaminant separation system of this disclosure. Accordingly, the scope of the water-contaminant separation system of this disclosure should be determined not by the embodiments illustrated, but by the appended claims and their legal equivalents.

Applicant[s] have attempted to disclose all the embodiments of the water-contaminant separation system of this disclosure that could be reasonably foreseen. It must be understood, however, that there may be unforeseeable insubstantial modifications to water-contaminant separation system of this disclosure that remain as equivalents and thereby falling within the scope of the water-contaminant separation system of this disclosure.

What is claimed is:

1. A water-contamination separation system comprising:
   (a) at least two water separation units, each having an inlet member for receiving contaminated water and a discharge member for discharging cleaner water, wherein a first water separation unit of said at least two water separation units receives contaminated water from a body of water and discharges cleaner water into a receptacle or into a second water separation unit of said at least two water separation units;
   (b) a pump attached to the discharge member of said first water separation unit of said at least two water separation units and to the inlet member of said second water separation unit of said at least two water separation units; and
   (c) a conveyor component means having a first end and a second end, said conveyor component means for communicating with said contaminated water at said first end and conveying said contaminated water to said second end and into the inlet member of the first water separation unit of said at least two separation units, wherein said conveyor component means comprises a conveyor belt, a drive pulley at said second end, and a weight pulley at said second end and nested in a cradle, said weight pulley above and rearward of said drive pulley and in direct gravitational communication with said conveyor belt pressing against said conveyor belt forcing said conveyer belt to be pressed against said drive pulley as said conveyor belt passes between the drive pulley and the weight pulley.

2. The system of claim 1 further comprising attachment to a mobile platform.

3. The system of claim 2 wherein said mobile platform is a sea-going vessel.

4. The system of claim 2 wherein said mobile platform is a land-roving vessel.

5. The system of claim 1 wherein said conveyor component means comprises a conveyor belt comprised of a non-absorbent material.

6. The system of claim 5 wherein said non-absorbent material comprises loop-type members of a hook-and-loop fastening component.

7. The system of claim 5 wherein said conveyor belt further comprises a plurality of apertures through said conveyor belt.

8. The system of claim 1 wherein said conveyor component means further comprises a scraper below said drive pulley having a top edge angled rearward and in scraping communication with said conveyor belt as said conveyor belt passes between said drive pulley and said scraper.

* * * * *